United States Patent Office 3,489,531
Patented Jan. 13, 1970

3,489,531
MULTILAYER SINTERED CONTACT BODY
Horst Schreiner, Nuremberg, and Rudolf Scherbaum, Regensburg, Germany, assignors to Siemens Aktiengesellschaft, a corporation of Germany
Filed Sept. 19, 1967, Ser. No. 668,767
Claims priority, application Germany, Sept. 20, 1966, S 105,942
Int. Cl. B22f 7/00, 7/02
U.S. Cl. 29—182.2                                  4 Claims

ABSTRACT OF THE DISCLOSURE

Described is a multilayer sintered contact body, of low welding strength, wherein the contact layer consists of a main contact layer comprised of a material with low welding strength and a surface layer with an even smaller welding strength.

---

Figure 1:
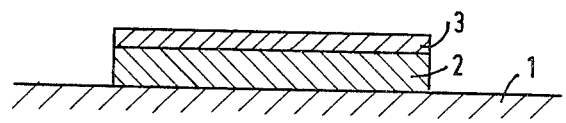

Up to now one has primarily used systems of metal-metal compound and metal-metalloid for multilayer sintered contacts to achieve a better and easier application of the contacts. Preferred contact materials with a content of metal oxide or metalloid are, for example, Ag-CdO, Ag-Ni-CdO, Ag-SnO₂, Ag-MgO, Ag-graphite. In order to produce a contact which would possess good contacting properties with respect to the contacting as well as good soldering and welding qualities on the connecting side, a second layer of a material having good solder and welding properties was applied on the side to be soldered or welded.

In other cases, a multilayer contact body was used to achieve a higher burn-off strength. Also, in multilayer contact bodies having a contact layer of contact work material, which show a higher welding limit current intensity and a lower bridge forming strength of the contacts fused together during welding (welding strength), the required additional reduction of the welding strength has not yet been obtained especially in the case of short circuit switching (e.g., closing a shortened circuit when closing the switch) and at a certain short-circuit current intensity. In particular, those new contact surfaces that have not been previously subjected to switching will often intensively fuse and freeze at the first closing upon an existing short circuit. The force needed for rupturing the welded bridge is usually higher than the contact opening force of the switch. In these instances, the contacts remain welded together.

The present invention relates to a multilayer sintered contact body of low welding strength wherein the above-described difficulties are surmounted.

In accordance with the present invention, the contact layer consists of two differently composed layers.

Particularly preferred is a sintered contact body, whose contact layer is comprised of a "main contact layer" of a material having a low welding force, upon which is located the second contact layer, or "surface-layer," comprised of a material of lower welding strength than the material of the main contact layer. The main contact layer is considerably thicker than the surface layer.

The main contact layer may consist of the known contact material combinations which are used for contact pieces of low welding strength, such as Ag-CdO, Ag-In₂O₃, Ag-SnO₂, Ag-PbO, Cu-PbO, Ag-ZnO, Ag-Fe₂O₃, Ag-MO₃, Ag-WC, AgCdO-Ni, AgCdO-C or Ag-C (graphite). With a small addition amount, for example <5% for the indicated metal-oxide additions, or <2% for the graphite addition, only a small reduction in welding strength relative to the original metal is obtained. An increased addition amount of metal oxide or graphite increases the effect upon the welding qualities and the welding strength diminishes to a greater degree. A preferred range for the addition of metal-oxide is between 5 and 15% and for graphite between 2 and 10%. Larger amounts of additional components for the basic metal silver or copper, for example >15% metal oxide or >10% graphite will change not only the welding qualities but also other characteristics of the contact material. These changes may have an adverse effect on a switching device. Thus, for example, the burn-off of the contact material decreases with increasing amounts of metal oxide or graphite addition to the basic metal. It is, therefore, impossible to fabricate the entire contact piece of the aforedescribed combination having a high share of oxide or graphite, which though it possesses adequate welding safety, has a burn-off which is too high. However, a contact material with a higher content of addition or supplemental components has very special advantages when used as a surface layer on a main contact layer having a smaller content of additional components. Particularly, in the short-circuit switching of new or infrequently switched contact pieces, a great technical progress is obtained, since one obtains contact pieces of weld-proof material, which under the same conditions would weld but for the layer which has the increased welding safety.

The second contact layer is located at the contact surface and is effective during the first switchings of the new contacts. The surface layer may be relatively thin compared to the main contact layer and is between 0.02 and 0.3 mm., preferably 0.15 mm. Another layer of an easily solderable or easily weldable metal may be applied on the side facing the carrier metal.

Figure 2:
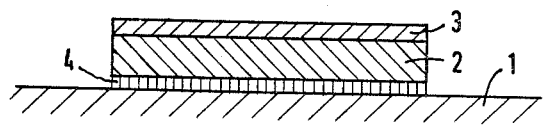

For a further disclosure of the construction of the contacts of the present invention, reference is made to the drawing, wherein:

FIGS. 1 and 2 schematically show the construction of the contacts of the present invention.

The reference numerals are the same in both figures. The carrier metal is numbered 1, the main contact layer 2, and the surface layer 3. According to FIG. 2, an easily solderable and weldable layer 4 is arranged between the carrier metal 1 and the main contact layer 2.

The application of the surface layer upon the main contact layer may be effected by filling an appropriate powder mixture, for example, an Ag-graphite powder mixture, into a matrix, followed by mutual compressing, sintering and recompressing processes. The contact body may be connected with the contact carrier by means of welding or soldering.

Due to an easier solderability, it is preferable in some instances, to have a good weldable and solderable layer present on the back side of the contact. A good solderable layer, for example, a silver or copper layer, may be applied upon the solder side of the main contact layer. This may be done by a compressing process. In this case, three variously composed powders are filled, one upon another, into the matrix or mold, for example, first silver powder for the easily solderable layer to a layer thickness of 0.3 mm., second, the main contact layer to a layer thickness of approximately 2.7 mm., and then the contact surface layer at a layer thickness of 0.1 mm. The indicated layer thicknesses relate to the recompressed sintered contact. The filling heights of the powder layers are larger, as the filling factor is approximately 3.

The stratified powders are compressed at 4 t./cm.² (ton/square centimeter), the pressed object is sintered for one hour in hydrogen, at 800° C., and the sintered objects are recompressed at 8 t./cm.², calibrated and compressed into an end piece.

It was particularly advantageous to perforate the surface layer of the sintered contact. This may be achieved, for example, by repressing the sintered contact with a knurled press die. A further reduction of the welding strength could be obtained for short-circuit switchings with contacts having a perforated or relief-type, roughened surface layer.

As a detailed specific example, contact pieces of AgC were produced in accordance with the present invention. The two contact layers may consist of the aforementioned combinations, whereby the thicker main contact layer has a smaller content of graphite (metal oxide could be substituted) than the thinner surface layer. The graphite content in the surface layer is designed for the smallest possible welding strength. The contact layers are comprised of silver graphite. Particularly preferable are contact bodies whose main contact layer constitutes Ag-graphite in the ratio 95:5:: Ag:graphite, and whose main contact layer has a surface layer of Ag-graphite in the ratio 80:20:: Ag:graphite. This surface layer of 80/20 Ag-graphite is characterized by a considerably lower welding strength compared to the layer of 95/5 Ag-graphite. The thickness of the surface layer is between 0.05 and 0.2 mm. It amounts to approximately 5 to 10% of the thickness of the main contact layer.

Surprisingly, in a welding current range between 700 to 1500 A., the contact bodies of the present invention do not weld in switchings upon short circuits, so that any welding bridges may be separated with an opening strength of <400 p. Contacts with a diameter of about 5 mm. and a height of 2.5 mm. may be used, for example, as contacts for an automatically alternating current of 20 A. rating.

Thus produced contact bodies, used in an AC alternate of 20 A. rated current, could not be made to weld when switching on short circuit currents between 700 and 1500 A., or when switching upon the non-contacted new contact areas (surfaces). When switching below the rated current or below short circuit current conditions, the surface layer burns off and the main contact layer, which has an adequate welding security in a switched state, finally forms the contact surface.

We claim:
1. A multilayer sintered contact body of low welding strength, wherein the contact layer consists of a main contact layer consisting essentially of a material with low welding strength, and a surface layer with an even smaller welding strength, said main contact layer is selected from silver or copper with a 5 to 15% metal oxide or 2 to 10% graphite addition and said surface layer is selected from silver or copper with over 15% metal oxide or over 10% graphite addition.

2. The contact body of claim 1, wherein the surface layer is perforated.

3. The contact body of claim 1, wherein the main contact layer amounts to 90 to 95%, and the surface layer amounts to 5 to 10% of the total thickness of the contact layer.

4. The contact body of claim 3, wherein the main contact body is selected from combinations from the group of Ag-CdO, Ag-$In_2O_3$, Ag-$SnO_2$, Ag-PbO, Cu-PbO, Ag-ZnO, Ag-$Fe_2O_3$, Ag-$MO_3$, Ag-WC, Ag-CdO-Ni, Ag-MgO-N; and Ag-CdO-C and AgC.

References Cited

UNITED STATES PATENTS

| | | | |
|---|---|---|---|
| 2,706,759 | 4/1955 | Williamson | 252—514 X |
| 3,248,681 | 4/1966 | Reintgen | 29—199 X |
| 3,359,623 | 12/1967 | Gwyn | 75—208 X |
| 3,373,003 | 3/1968 | Schreiner | 29—182.2 |
| 3,385,677 | 5/1968 | Schreiner | 29—182.5 |
| 3,410,722 | 11/1968 | Flanders | 252—514 X |

CARL D. QUARFORTH, Primary Examiner

A. J. STEINER, Assistant Examiner

U.S. Cl. X.R.

29—182.5; 175—208; 211—182.7